(12) United States Patent
Oga et al.

(10) Patent No.: US 8,561,296 B2
(45) Date of Patent: Oct. 22, 2013

(54) METHOD FOR PRODUCING WIRING HARNESS

(75) Inventors: Tatsuya Oga, Kosai (JP); Hidehiro Ichikawa, Kosai (JP); Takeshi Ogue, Kosai (JP)

(73) Assignee: Yazaki Corporation, Tokyo (JP)

( * ) Notice: Subject to any disclaimer, the term of this patent is extended or adjusted under 35 U.S.C. 154(b) by 1099 days.

(21) Appl. No.: 12/461,641

(22) Filed: Aug. 19, 2009

(65) Prior Publication Data
US 2010/0043225 A1 Feb. 25, 2010

(30) Foreign Application Priority Data

Aug. 19, 2008 (JP) ................................. 2008-210249

(51) Int. Cl.
*H01R 43/00* (2006.01)
(52) U.S. Cl.
USPC ............................. 29/857; 29/825; 174/72 A
(58) Field of Classification Search
USPC ........... 29/33 F, 33 M, 825, 857; 16/2.1, 2.2; 174/72 A, 72 C, 152 G, 167, 650, 651; 361/826, 827
See application file for complete search history.

(56) References Cited

U.S. PATENT DOCUMENTS

| 6,081,964 | A  | * | 7/2000 | Mori ................................. 16/2.2 |
| 6,376,777 | B1 | * | 4/2002 | Ito et al. ..................... 174/152 G |
| 7,172,042 | B2 |   | 2/2007 | Yamaguchi et al. |
| 7,253,361 | B2 | * | 8/2007 | Nishijima et al. .......... 174/72 A |
| 7,561,445 | B2 | * | 7/2009 | Yajima et al. ................. 361/826 |

FOREIGN PATENT DOCUMENTS

| JP | 09-327111 | 12/1997 |
| JP | 11-178164 | 7/1999 |
| JP | 2000-091043 | 3/2000 |
| JP | 2002-186133 | 6/2002 |
| JP | 2004-224156 | 8/2004 |

* cited by examiner

*Primary Examiner* — Donghai D. Ngyuyen
(74) *Attorney, Agent, or Firm* — Edwards Wildman Palmer LLP

(57) ABSTRACT

In a first production process, firstly, a flat corrugate tube 23 having a necessary length for wiring is prepared. Next, a grommet 25 and a protector 24 are assembled with the flat corrugate tube 23 at predetermined positions. In a second production process, high-voltage power lines 22 and low-voltage electric wires 27 are inserted into the flat corrugate tube 23 from the one opening 40 toward the other opening 41. In a third production process, ends of the high-voltage power lines 22 and the low-voltage electric wires 27 exposed from the one opening 40 and the other opening 41 of the flat corrugate tube 23 are treated. When the third production process is finished, the production of the wiring harness 21 is finished.

5 Claims, 4 Drawing Sheets

METHOD FOR PRODUCING WIRING HARNESS

CROSS REFERENCE TO RELATED APPLICATIONS

This application is on the basis of Japanese Patent Application No. 2008-210249, the contents of which are hereby incorporated by reference.

BACKGROUND OF THE INVENTION

1. Field of the Invention

The present invention relates to a method for producing a wiring harness.

2. Description of the Related Art

A wiring harness disclosed in Patent Document 1 listed below includes: three high-voltage electrical power lines; and three metallic protection pipes respectively receiving thee high-voltage electrical power lines. The high-voltage electrical power lines connect a motor mounted at a front side of a vehicle to an inverter mounted at a middle or rear side of the vehicle.

The wiring harness is arranged via an under floor of a vehicle body disposed at an outside of a vehicle body frame. Therefore, the metallic protection pipe protects the high-voltage electrical power line from a jumping stone or spattering water. Further, the metallic protection pipe has rigidity to prevent a slack of the high-voltage electrical power line, and works as an electromagnetic shield because of a metallic body.

The wiring harness is produced by firstly inserting three high-voltage electrical power lines into three straight metallic protection pipes respectively, and by bending the metallic protection pipes along wiring routes of the wiring harness at the under floor of the vehicle. After the wiring harness is produced as described above in a factory of a harness maker, the wiring harness is delivered to an assembly factory of a car maker, and assembled on a predetermined position of a vehicle, thereby an arrangement of the wiring harness is finished.

Incidentally, because the wiring harness is arranged through the under floor, and arranged penetrating a vehicle body panel toward an inside of the vehicle, waterproof treatment is needed at the vehicle body panel. Regarding the waterproof treatment, for example, Patent Document 2 discloses one technique. Namely, a waterproof structure is known in which a through hole is formed on the vehicle body panel, and a grommet is attached to the through hole.

Patent Document 2 discloses two examples. In one example, the number of openings corresponds to the number of electric wires. In the other example, gelled polymer is used. In the former example, wires are extracted through the openings respectively. In the latter example, the gelled polymer is wrapped around tied wires, and then, the tied wires are inserted into the grommet.

[Patent Document 1] Japanese Published Patent Application No. 2004-224156

[Patent Document 2] Japanese Published Patent Application No. H11-178164

Regarding the wiring harness disclosed in Patent Document 1, firstly, the high-voltage electrical power line is inserted into the straight metallic protection pipe, then this operation is repeated in the number of the high-voltage electrical power lines, and then, the metallic protection pipes are bent. Therefore, there is a problem that productivity is relatively low. Further, because using the metallic pipes, there is a problem that handling ability is low not only during the wiring harness production but also after the wiring harness production.

On the other hand, regarding the waterproof structure disclosed in Patent Document 2, it is necessary to draw-the electric wire through the grommet one by one, or to wrap the gelled polymer around the tied wires, and insert the tied wire into the grommet. Therefore, there is a problem that wiring workability is low in both cases. Consequently, when the wiring harness is arranged in the under floor, waterproof treatment affects the wiring workability.

Accordingly, an object of the present invention is to provide a method for producing a wiring harness to improve productivity, handling ability, and wiring workability.

SUMMARY OF THE INVENTION

In order to attain the object, according to the present invention, there is provided a method for producing a wiring harness including: a plurality of high-voltage electrical power lines extending from a font side of an inner vehicle body of a hybrid vehicle or an electric vehicle through an under floor disposed at an outside of a vehicle body frame to a rear side of the inner vehicle body to connect a battery and an inverter or to connect a motor to the inverter; a protection member for protecting the high-voltage electrical power lines composed of a corrugate tube protecting the high-voltage electrical power lines together with no slit, and bendable at a desired position; and a waterproof grommet to be watertightly assembled with a through hole of a vehicle body panel communicating with the inner vehicle body, said method including the steps of:

watertightly assembling the waterproof grommet with the corrugate tube in a middle thereof so that the corrugate tube is extended back and forth of the waterproof grommet in a first production process;

inserting the high-voltage electrical power lines from one opening of the corrugate tube extending substantially straight to the other opening of the corrugate tube in a second production process; and treating the ends of the high-voltage electrical power lines exposed from both the one and the other openings in a third production process.

Preferably, the method further including the steps of:

assembling a fixing member for fixing the corrugate tube to the under floor of the vehicle body with a predetermined position of the corrugate tube in the first production process.

Preferably, the corrugate tube is a flat corrugate tube having a noncircular section, and in the second production process, the high-voltage electrical power lines are inserted into the corrugate tube to be arranged in parallel in a plane.

According to the method for producing a wiring harness of the present invention described above, a grommet and a fixing member such as a clip are previously assembled with a good-handling corrugate tube. Then, a plurality of high-voltage electrical power lines are inserted into the corrugate tube, thereby a wiring harness can be relatively easily produced. Further, this wiring harness allows to be easily wired. Further, according to the structure of the wiring harness described above, not only productivity but also handling ability are improved. In this invention, the treatment of the ends of the high-voltage electrical power lines is done in the third production process. Because it allows a size of the corrugate tube is independent from a size of the end of the high-voltage electrical power line. Therefore, the size of the corrugate tube can be necessity minimum. Namely, according to the present invention, the wiring harness can be slim. The slim wiring harness improves the handling ability and the wiring workability. In addition, the flat corrugate tube allows the height of the wiring harness to be low.

These and other objects, features, and advantages of the present invention will become more apparent upon reading of the following detailed description along with the accompanied drawings.

DETAILED DESCRIPTION OF THE PREFERRED EMBODIMENTS

A wiring harness according to the present invention will be explained with reference to figures.

A wiring harness of this embodiment is used in a hybrid vehicle or an electric vehicle. Hereafter, a case that the wiring harness is used in the hybrid vehicle is explained. (In a case of the electric vehicle, a structure, a configuration, and an effect of the wiring harness are basically the same.)

Figure 1:
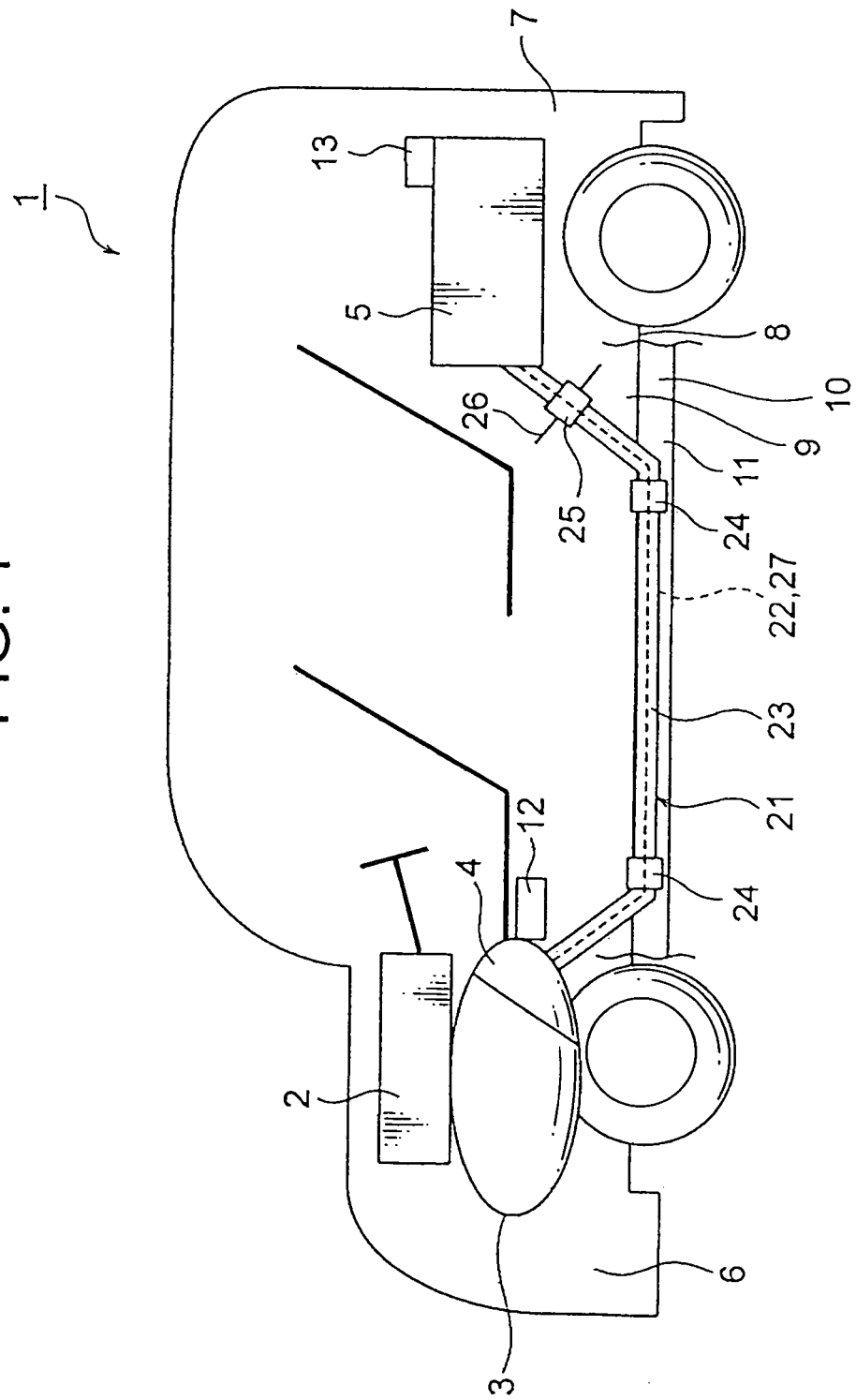
FIG. 1 is a schematic view showing an embodiment of a wiring harness produced by a method according to the present invention.

In FIG. 1, a reference numeral 1 indicates a hybrid vehicle. The hybrid vehicle 1 mixes driving forces of an engine 2 and a motor 3. A battery 5 supplies an electric power to the motor 3 via an inverter 4. In this embodiment, the engine 2, the motor 3, and the inverter 4 are mounted on a front side 6 of an inner vehicle body where front wheels are disposed. Further, the battery 5 is mounted on a rear side 7 of the inner vehicle body where rear wheels are disposed.

A reference numeral 8 indicates a vehicle body frame. In FIG. 1, an upper side of the vehicle body frame 8 indicates a vehicle upper floor 9. Further, a lower side of the vehicle body frame 8 indicates a vehicle under floor 10. A reinforcement 11 having a substantially convex section for reinforcing a vehicle body is arranged in the under floor 10. The reinforcement 11 extends from a front side to the rear side of the vehicle. A reference numeral 12 at a front side 6 of the inner vehicle body indicates a commonly-known electric junction box such as a relay box. Further, a reference numeral 13 at a rear side 7 of the inner vehicle body indicates a commonly-known low-voltage battery. (An arrangement of the low-voltage battery 13 is shown as an example.)

In this embodiment, the motor 3 includes a motor and a generator. Further, the inverter 4 includes an inverter and a converter. The inverter 4 is an inverter assembly and includes an inverter for an air conditioner, an inverter for a generator, and an inverter for a motor. The battery 5 is a Ni-MH system, a Li-ion system or the like, and is a battery module. Incidentally, a capacitor can be used instead of the battery.

A wiring harness 21 produced according to a method of the present invention connects the inverter 4 and the battery 5.

The wiring harness 21 according to the present invention includes: a plurality of high-voltage electrical power lines 22 for electrically connecting the inverter 4 and the battery 5; a flat corrugate tube 23 (protection member) for protecting together the high-voltage power lines 22; a protector 24 for fixing the wiring harness to the vehicle body; and a waterproof grommet 25 watertightly assembled with a vehicle panel through hole (not shown) communicating with the rear side 7 of the inner vehicle body.

Incidentally, the not-shown vehicle panel though hole penetrates a vehicle body panel 26. In this embodiment, the protection member is the flat corrugate tube 23. However, the present invention is not limited to this. A corrugate tube having a circular section can be used as the protection member.

In this embodiment, the wiring harness 21 also includes a plurality of commonly-known low-voltage electric wires 27. (In this embodiment, because the low-voltage battery 13 is disposed at the rear side 7 of the inner vehicle body, the wiring harness 21 includes the low-voltage electric wires 27. In this embodiment, the low-voltage battery 13 is a battery module.)

The wiring harness 21 extends from the front side 6 of the inner vehicle body via the vehicle under floor 10 to the rear side 7 of the inner vehicle body. The wiring harness 21 penetrates the vehicle body frame 8 and/or the vehicle body panel 26. Hereunder, components of the wiring harness 21 will be explained.

The high-voltage power lines 22 are commonly-known power cables each having a circular section and a predetermined diameter. The high-voltage power lines 22 are wider than the low-voltage electric wires 27. A conducting body disposed at the center of the high-voltage power line 22 is made of copper, copper alloy, aluminum or the like. In this embodiment, two high-voltage power lines 22 are provided. Further, a connector 27 (see FIG. 2) having terminal fittings for connecting to electric components is disposed at ends of the high-voltage power lines 22. Incidentally, the high-voltage power lines 22 may include a braided wire for shielding the high-voltage power lines 22. (A braided wire may shield together a plurality of the high-voltage power lines 22.)

The low-voltage electric wires 27 are protected by the flat corrugate tube 23 together with the high-voltage power lines 22. One ends of the low-voltage electric wires 27 are connected to the electric junction box 12, and the other ends of the low-voltage electric wires 27 are connected to the low-voltage battery 13.

Figure 2A:
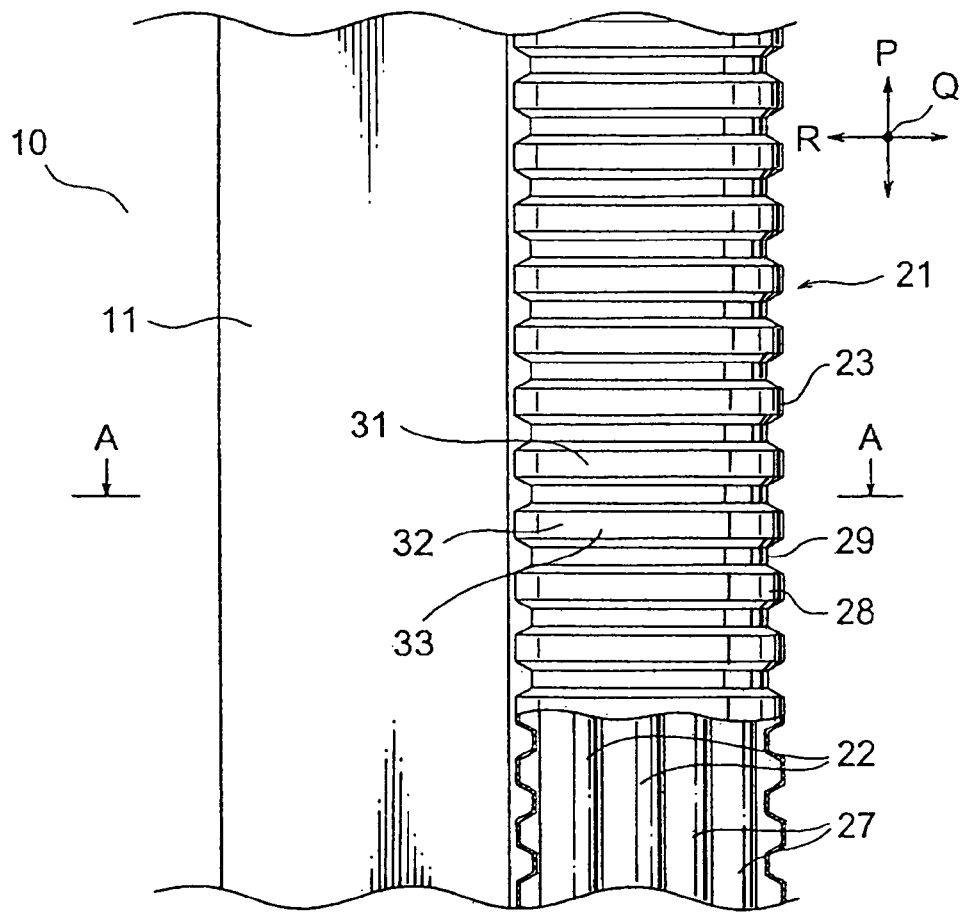
FIG. 2A is an enlarged partially sectional bottom view showing a flat corrugate tube and a reinforcement seeing from a ground to an under floor of a vehicle body.
Figure 2B:
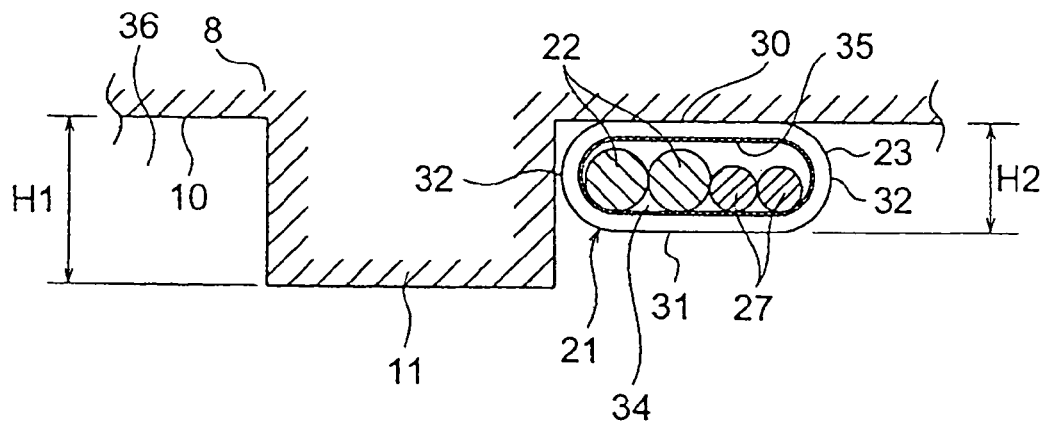
FIG. 2B is a sectional view taken on line A-A in FIG. 2A.

In FIGS. 1 and 2, the flat corrugate tube 23 for protecting the high-voltage power lines 22 and the low-voltage electric wires 27 has a noncircular (here, oval) section, and is made of insulating synthetic resin. The flat corrugate tube 23 is formed in an accordion shape having hills 28 and valleys 29 extending alternately along an axis (see an arrow P direction in FIG. 2) of the flat corrugate tube 23. The flat corrugate tube 23 having such a shape is easily bent in a Q direction perpendicular to a paper of FIG. 2, and is hardly bent in an arrow R direction (width direction). Thus, the bent direction of the flat corrugate tube is regulated. (The flat corrugate tube 23 is allowed to be bent at a desired position in Q direction.)

In detail, the flat corrugate tube 23 is composed of a pair of facing planes and a pair of curved walls connecting the planes. (Thereby the sectional shape of the flat corrugate tube 23 is oval. Incidentally, the oval sectional shape is an example.) Specifically, the flat corrugate tube 23 includes: an under floor wall 30; a wall opposite to the ground 31; and a pair of curved walls 32. The under floor wall 30, the wall opposite to the ground 31, and a top wall 33 which is to be the curved wall 32 are formed on the hill 28.

The flat corrugate tube 23 is in such a figure to make the height Hi of the reinforcement 11 (from the under floor 10 to the projecting end of the reinforcement 11) taller than the height H2 the flat corrugate tube 23. Namely, the flat corrugate tube 23 is in such a figure to make the flat corrugate tube 23 lower than the reinforcement 11. That is because an inner space 34 of the flat corrugate tube 23 can receive the high-voltage power lines 22 and the low-voltage electric wires 27 arranged in parallel in a plane. The inner space 34 is so formed that a gap between the high-voltage power lines 22 and an inner wall 35 of the flat corrugate tube 23 becomes minimum while the inner space 34 receives the high-voltage power lines 22 and the low-voltage electric wires 27 arranged in parallel in a plane. (Incidentally, the gap is adjusted so that the wiring harness is produces smoothly.) When the flat corrugate tube 23 is disposed at a side of the reinforcement 11, the flat corrugate tube 23 is hidden in a dead space generated by the reinforcement 11.

The flat corrugate tube 23 is formed in a seamless shape having no slit in the axial direction thereof (an arrow P direction in FIG. 2). The high-voltage power lines 22 and the low-voltage electric wires 27 are inserted into the flat corrugate tube 23 from one opening toward the other opening of the flat corrugate tube 23.

In this embodiment, a common corrugate tube having a slit is not used. That is because there is a possibility that splashing water enters the corrugate tube through the slit when a vehicle runs. Further, there is a possibility that the slit is open when the corrugate tube having the slit is bent, and a skipping stone may affect a wiring condition of the wiring harness when the vehicle runs.

In FIG. 1, the protector 24 is used as a fixing member to fix the wiring harness 21 onto the vehicle body. (A commonly-known clip may be used.) The protector 24 is made of insulating synthetic resin, and assembled with the flat corrugate tube 23.

Incidentally, the flat corrugate tube 23 can be replaced with a plurality of corrugate tubes. In this case, the protector 24 bundles the flat corrugate tubes 23 adjacent to each other.

Figure 3A:
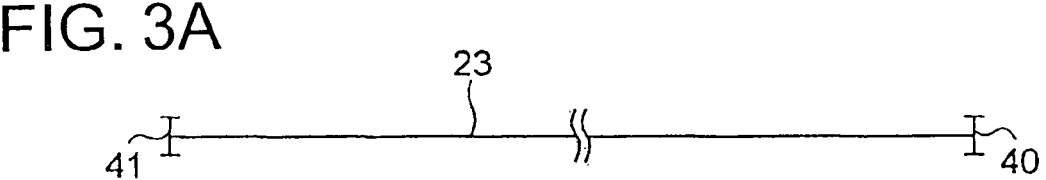
FIG. 3A is a schematic view showing a flat corrugate tube.
Figure 3B:
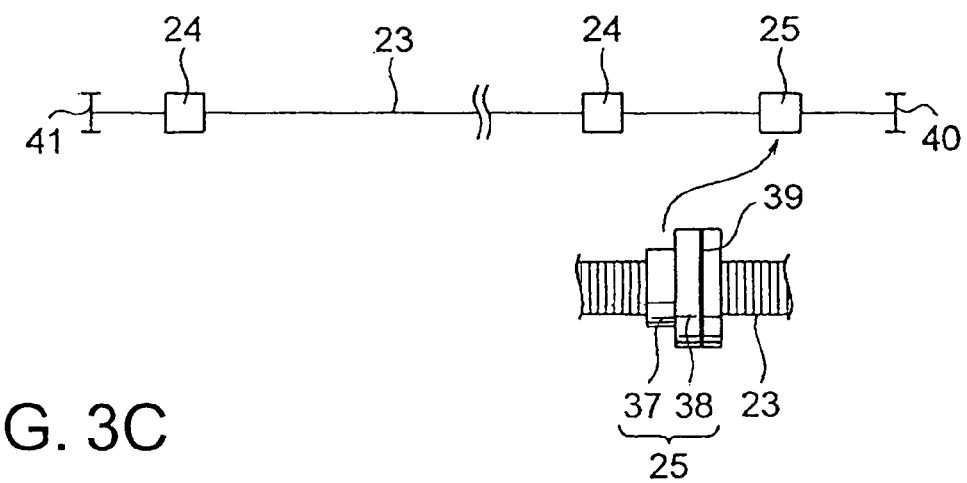
FIG. 3B is a schematic view showing grommets assembled with the flat corrugate tube.

In FIGS. 1 and 3B, the grommet 25 is resilient and made of rubber or elastomer. The grommet 25 includes: a tubular tube sealing part 37 into which the flat corrugate tube 23 is inserted; and a panel sealing part 38 continued from the tube sealing part 37 and watertightly assembled with a through hole (not shown) of the vehicle body panel 26. A plurality of circular projections (not shown) is formed on an inner wall of the tube sealing part 37. The circular projections are inserted into the valley 29 (see FIG. 2) of the flat corrugate tube 23 and closely contact the valley 29. Owing to the circular projections, the grommet 25 watertightly contacts the flat corrugate tube 23.

A reference numeral 39 of the panel sealing part 38 indicates a portion which is fitted into and closely contacts the through hole of the vehicle body panel. The panel sealing part 38 is projected in and out (back and forth) of the vehicle body panel 26.

Next, a production of the wiring harness 21 will be explained with reference to FIGS. 3A to 3D. The wiring harness 21 is produced through from a first production process to a third production process sequentially.

In FIG. 3A, in the first production process, the flat corrugate tube 23 having a necessary length for wiring is prepared. Next, as shown in FIG. 3B, the grommet 25 and the protector 24 are assembled with the flat corrugate tube 23 at predetermined positions. At this time, the grommet is watertightly assembled at the center of the flat corrugate tube 23. Before the grommet 25 is assembled, the tube sealing part 37 is widened and the grommet 25 is inserted into the flat corrugate tube 23 from the one opening 40 of the flat corrugate tube 23.

Figure 3C:
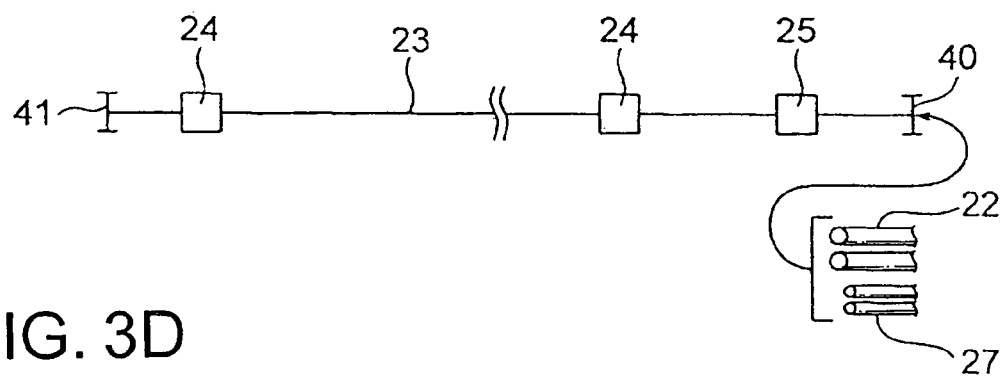
FIG. 3C is a schematic view showing just before inserting the high-voltage electrical power lines into the flat corrugate tube.

In FIG. 3C, in a second production process, the high-voltage power lines 22 and the low-voltage electric wires 27 are inserted into the flat corrugate tube 23 from the one opening 40 toward the other opening 41. After the second production process is finished, the high-voltage power lines 22 and the low-voltage electric wires 27 are arranged in parallel in a plane in the flat corrugate tube 23.

Figure 3D:
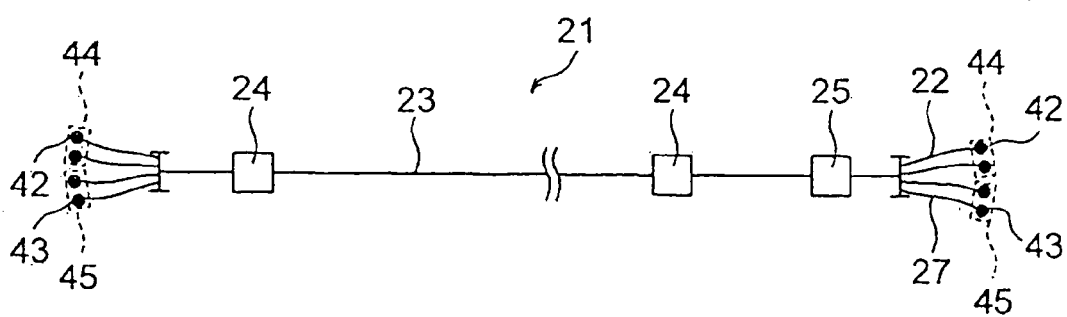
FIG. 3D is a schematic view showing just after treating ends of the high-voltage electrical power lines and just after finishing a wiring harness production.

In FIG. 3D, in the third production process, ends of the high-voltage power lines 22 and the low-voltage electric wires 27 exposed from the one opening 40 and the other opening 41 of the flat corrugate tube 23 are treated. In the third production process, terminal fittings 42, 43 are connected to the ends of the high-voltage power lines 22 and the low-voltage electric wires 27, and connectors 44, 45 are provided. (The connectors are shown as an example.) When the third production process is finished, the production of the wiring harness 21 is finished.

Next, assembling of the wiring harness 21 with a vehicle will be explained with reference to FIGS. 4A to 4D.

Figure 4A:
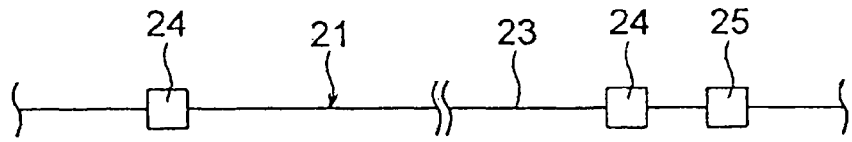
FIG. 4A is a schematic view showing the wiring harness just after producing.
Figure 4B:
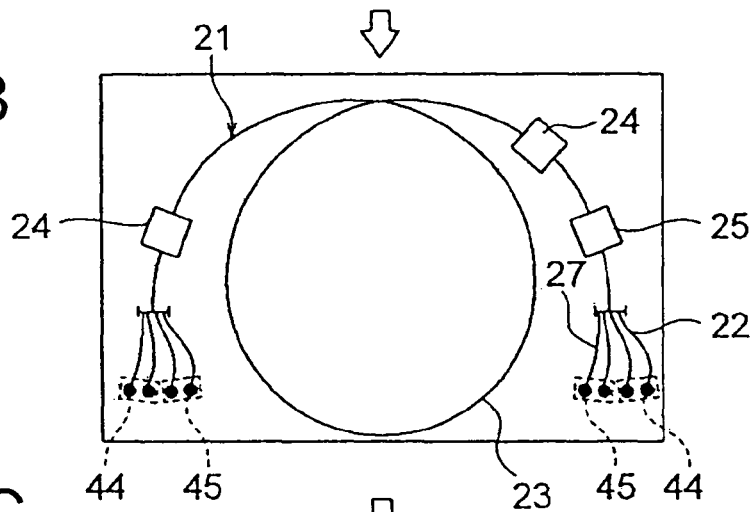
FIG. 4B is a schematic view showing the wiring harness received in a universal carrier to be delivered.
Figure 4C:
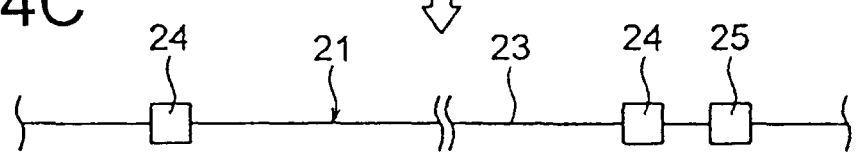
FIG. 4C is a schematic view showing the wiring harness just before assembling with a vehicle.
Figure 4D:
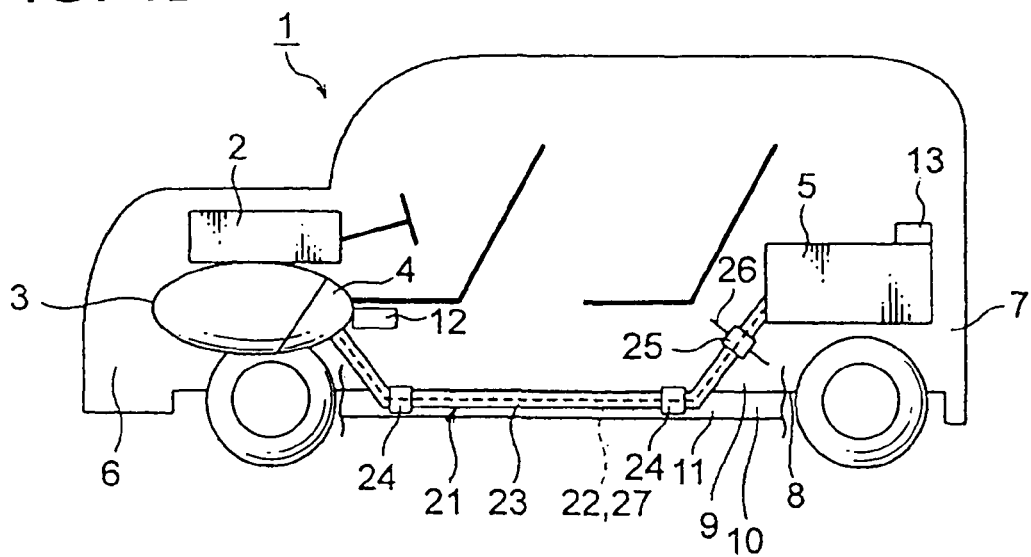
FIG. 4D is a schematic view showing the wiring harness just after assembling with the vehicle.

In FIG. 4A, the flat corrugate tube 23 of the wiring harness 21 is bent at a desired position to be rolled as shown in FIG. 4B. Next, the rolled wiring harness 21 is received in a universal carrier 46. The wiring harness 21 received in the carrier 46 is delivered to an assembly factory of a car maker by a delivery vehicle. In the assembly factory, before the wiring harness 21 is assembled with a vehicle, the wiring harness 21 is taken out of the carrier 46 (see FIG. 4C). Then, the wiring harness 21 is assembled with a vehicle at a predetermined position of the vehicle. When the assembly is finished, the wiring of the wiring harness 21 is finished.

While the wiring harness 21 is wired, waterproof treatment is finished by only fitting the panel sealing part 38 of the grommet 25 into the through hole (not shown) of the vehicle body panel.

As described above with reference to FIGS. 1 to 4D, the wiring harness 21 has good productivity, good handling ability, and good wiring workability. Therefore, an effect of the present invention is to provide a method for producing a useful wiring harness.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for producing a wiring harness, wherein the wiring harness comprises:
    a plurality of high-voltage electrical power lines extending from a font side of an inner vehicle body of a hybrid vehicle or an electric vehicle through an under floor disposed at an outside of a vehicle body frame to a rear side of the inner vehicle body to connect a battery and an inverter or to connect a motor to the inverter;

a protection member for protecting the high-voltage electrical power lines composed of a corrugate tube protecting the high-voltage electrical power lines together with no slit, and bendable at a desired position; and a waterproof grommet to be watertightly assembled with a through hole of a vehicle body panel communicating with the inner vehicle body, said method comprising the steps of:

watertightly assembling the waterproof grommet with the corrugate tube in a middle thereof so that the corrugate tube is extended back and forth of the waterproof grommet in a first production process;

followed by inserting the high-voltage electrical power lines from one opening of the corrugate tube extending substantially straight to the other opening of the corrugate tube in a second production process; and treating the ends of the high-voltage electrical power lines exposed from both the one and the other openings in a third production process after the second production process.

2. The method as claimed in claim 1 further comprising the steps of:

assembling a fixing member for fixing the corrugate tube to the under floor of the vehicle body with a predetermined position of the corrugate tube in the first production process.

3. The method as claimed in claim 2, wherein the corrugate tube is a flat corrugate tube having a noncircular section, and wherein in the second production process, the high-voltage electrical power lines are inserted into the corrugate tube to be arranged in parallel in a plane.

4. The method as claimed in claim 1, wherein the corrugate tube is a flat corrugate tube having a noncircular section, and wherein in the second production process, the high-voltage electrical power lines are inserted into the corrugate tube to be arranged in parallel in a plane.

5. The method as claimed in claim 1 further comprising the steps of:

bending the corrugate tube at a desired position to be rolled in a forth production process, and receiving the wiring harness in a universal carrier in a fifth production process.

\* \* \* \* \*